United States Patent [19]

Graf von Zedlitz und Trützschler

[11] Patent Number: 4,843,498
[45] Date of Patent: Jun. 27, 1989

[54] DICTATING MACHINE ARRANGED LIKE A TELEPHONE HANDSET

[75] Inventor: Helmut Graf von Zedlitz und Trützschler, Hamburg, Fed. Rep. of Germany

[73] Assignee: U.S. Philips Corporation, New York, N.Y.

[21] Appl. No.: 145,683

[22] Filed: Jan. 14, 1988

Related U.S. Application Data

[63] Continuation of Ser. No. 814,479, Dec. 30, 1985, abandoned.

[30] Foreign Application Priority Data

Jan. 5, 1985 [DE] Fed. Rep. of Germany ....... 3500280

[51] Int. Cl.⁴ ...................... G11B 15/00; G11B 31/00
[52] U.S. Cl. ..................................... 360/93; 360/137; 369/25; 369/69; 379/85
[58] Field of Search ............................ 360/137, 90, 93; 369/25, 26, 29, 31, 69; 379/85, 68; 446/141–142

[56] References Cited

U.S. PATENT DOCUMENTS 4,120,009 10/1978 Iwasawa ............................ 360/137
4,481,382 11/1984 Villa-Real ........................ 379/85 X Primary Examiner—A. J. Heinz
Attorney, Agent, or Firm—David R. Treacy

[57] ABSTRACT

A dictation machine having the physical configuration of a telephone handset. A mouth piece and an ear piece are arranged at opposite ends of a elongated housing having a handgrip between the ends. A tape deck is arranged in the handgrip, preferably in a flat face facing in the same direction as the mouth piece and ear piece. A start/stop key is arranged on a side of the handgrip, and other control keys are arranged in transition areas between the deck and the mouth piece or ear piece, so that the keys can be operated by the fingers of a hand which is holding the handset.

16 Claims, 1 Drawing Sheet

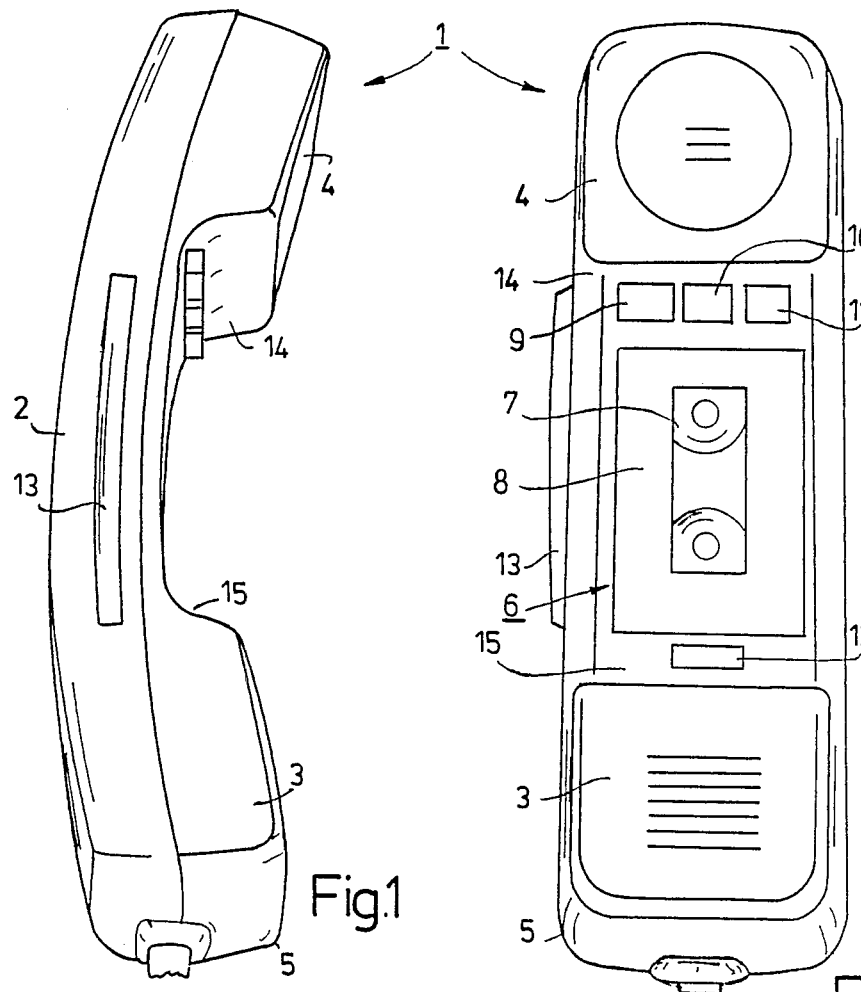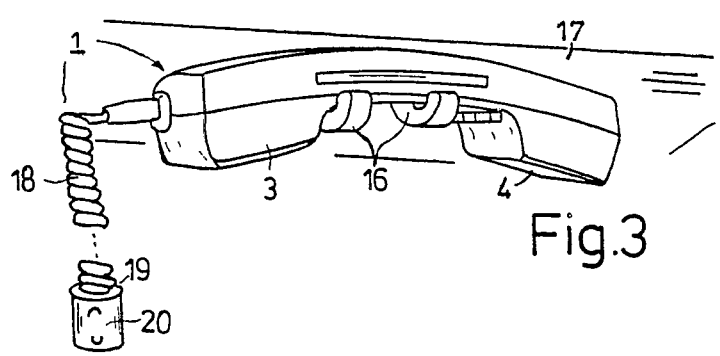

DICTATING MACHINE ARRANGED LIKE A TELEPHONE HANDSET

This is a continuation of application Ser. No. 814,479, filed Dec. 30, 1985, now abandoned.

BACKGROUND OF THE INVENTION

The invention relates to a device for transducing speech signals, comprising a mouth piece and an ear piece provided remote from each other on either side of a handgrip, the handgrip, the ear piece and the mouth piece being part of a housing like a telephone hand set.

Such handsets are generally known, and some are intended for cordless operation. Telephone handsets of such a type are extended to a complete telephone set by incorporating the dialling mechanism in the handgrip. The dialling mechanism is constituted by a numerical keyboard whose circuit arrangement is included in the handgrip.

A car telephone is known, in which the handset can be accommodated on a cradle on the dashboard of a motorcar. The connecting cable of the car-telephone hand set is connected to a transmitter and receiver arrangement provided in an appropriate place in the motorcar.

In addition, pocket dictating machines are known, with which a message spoken into a microphone can be recorded on a magnetic tape. The message stored on the magnetic tape can then be reproduced again via a loudspeaker. Pocket dictating machines of such a type are generally of a compact, rectangular shape, so that they are light and easy to transport.

SUMMARY OF THE INVENTION

The invention has for its object to provide a device of the type defined in the opening paragraph, which is implemented as a dictating machine and can more specifically be used as if it were the handset of a car telephone in a motorcar.

According to the invention this object is accomplished in that the housing includes a recording device for magnetic tape cassettes.

By incorporating a recording device for magnetic tape cassettes, the device in the shape of a telephone hand set can be used as a dictating machine, the mouth piece including the recording microphone and the ear piece including the reproduction loudspeaker or the receiver. Such a device can be used in a motorcar as if it were a car-telephone; with this device it is also possible to pretend as if the motorcar were provided with a car-telephone connection.

Preferably, the recording device is incorporated in the handgrip of the housing. Cordless telephones have a housing that in the region of the handgrip already has such a width that a tape transport mechanism of a magnetic tape cassette device can be accommodated therein without any further measures.

In accordance with a further embodiment of the invention, the control keys of the recording device are provided in a generally flat face in the transition area between the handgrip and the ear piece or the mouth piece, respectively, and a start/stop key is arranged on the side of the handgrip. In such a configuration, the operating keys can be appropriately operated without visual control of the fingers of the relevant hand.

In a further embodiment of the invention, a coiled power cable has a plug for insertion in a socket in a motorcar. When this socket is, for example, the jack of a cigarette lighter, then no special provisions need to be built into the car for operating the device. Only a hook or carrier must be provided somewhere in the dashboard of the motorcar to enable locating of the dictating machine as if it were a car telephone.

The invention will now be described in greater detail by means of example with reference to the embodiments shown in the drawing.

BRIEF DESCRIPTION OF THE DRAWING

FIG. 1 is a side elevational view of a dictating machine in the form of a telephone handset, FIG. 2 shows the dictating machine of FIG. 1 in a plan view from the operating side and FIG. 3 is an elevational side view of a dictating machine as shown in FIGS. 1 and 2, provided in a motorcar dashboard.

DESCRIPTION OF THE PREFERRED EMBODIMENT

The dictating machine 1 shown in FIG. 1 comprises an elongated housing 5, having a mouth piece 3 and an ear piece 4 arranged, remote from each other, at opposite ends, and facing in the same general direction so that the mouth piece 3 may be adjacent a user's mouth when the ear piece 4 is held against the user's ear. Between the mouth piece and ear piece the housing 5 is shaped as a handgrip 2. The housing 5 of the dictating machine 1 has consequently the shape of a telephone handset.

FIG. 2 shows in a plan view the modified structure of the dictating machine 1 as compared with a customary dictating machine and as compared with a customary telephone handset. A tape cassette deck 6 of a dictating machine is arranged between the mouth piece 3, which includes a microphone, not shown, and the ear piece 4, which includes a loudspeaker capsule not shown, in the handgrip 2. The dictating machine is, for example, suitable for using so-called mini or micro cassettes. Such a magnetic tape cassette 7 is accommodated behind a cover 8 for access through the cover.

For operating the recording device 6 control keys 9, 10, 11, 12, 13 are provided, distributed over the transition area 14 between the handgrip 2 and the ear piece 4 and also over the transition area 15 between the handgrip 2 and the mouth piece 3. In this embodiment the keys 9 and 11 for fast forward and rewind and also the recording keys 10 are arranged in the transition area 14. The on-off key 12 is located in the transition area 15. Preferably a large key 13 at the side of the handgrip 2 is used for starting and stopping the tape transport in the play/record mode.

As shown in FIG. 3, the dictating machine 1 can be placed by means of its housing 5 on a carrier 16 in the dashboard 17 of a motorcar. The connecting cable 18 for the dictating machine 1 is coiled and has at its free end 19 a plug 20 for insertion in a socket. When the machine is used in a motorcar, the plug 20 may, for example, be of such a structure that it fits in the socket of a cigarette lighter.

With such a structure and such an arrangement of a dictating machine it can not be distinguished from a motorcar telephone. Consequently, such a dictating machine can be provided, ready to hand, in the customary location of a car telephone in a motorcar.

What is claimed is:

1. A device for electronic information technology, and constituting a dictating machine, comprising
    an elongated housing, having a mouth piece and an ear piece remote from each other at respective ends of the housing, said pieces being disposed on a same side of said housing and facing in a same general direction so that the mouth piece may be adjacent a user's mouth when the ear piece is held against a user's ear; and a handgrip between said ear piece and mouth piece having a surface on said side,
    a tape cassette deck arranged in said handgrip on said same side, facing in said direction for access thereto through said surface, and
    a plurality of control keys arranged at least adjacent said handgrip, for controlling operation of said deck for recording of information spoken into said mouth piece and for playback of information through said ear piece, and located for engagement by flanges of said user on a hand which is gripping the handgrip.

2. A device as claimed in claim 1, characterized in that said plurality of keys includes a start/stop key arranged on said handgrip on a second side adjoining said same side.

3. A device as claimed in claim 2, characterized in that said surface is a generally flat face between said mouth piece and ear piece, facing in said direction, and
    said deck and at least one of said keys are arranged in said face.

4. A device as claimed in claim 3, characterized in that said face has at least one transition area between said deck and at least one of said pieces, and
    said plurality of keys includes at least one key disposed in a respective transition area.

5. A device as claimed in claim 4, having the external configuration of a telephone handset characterized by comprising an electrical power cable having a plug for insertion in a socket in a motorcar, said cable being a coiled connecting cable.

6. A device as claimed in claim 1, characterized in that said surface is a generally flat face between said mouth piece and ear piece, facing in said direction, and
    said deck and at least one of said keys are arranged in said face.

7. A device as claimed in claim 6, characterized in that said face has at least one transition area between said deck and at least one of said pieces, and
    said plurality of keys includes at least one key disposed in a respective transition area.

8. A device as claimed in claim 7, characterized by comprising an electrical power cable having a plug for insertion in a socket in a motorcar, said cable being a coiled connecting cable.

9. A device as claimed in claim 1, characterized by comprising an electrical power cable having a plug for insertion in a socket in a motorcar, said cable being a coiled connecting cable.

10. A telephone handset, comprising
    an elongated housing, having a mouth piece and an ear piece remote from each other at respective ends of the housing, said pieces being disposed on a same side of said housing and facing in a same general direction so that the mouth piece may be adjacent a user's mouth when the ear piece is held against a user's ear; and a handgrip between said ear piece and mouth piece, having a surface on said same side,
    means for making connection to said handset,
    a tape cassette deck arranged in said handgrip on said same side facing in said direction for access thereto through said surface, and
    a plurality of control keys arranged at least adjacent said handgrip, for controlling operation of said deck for recording of information spoken into said mouth piece and for playback of information through said ear piece, and located for engagement by fingers of said user on a hand which is gripping the handgrip.

11. A handset as claimed in claim 10, characterized in that said plurality of keys includes a start/stop key arranged on the side of said handgrip.

12. A handset as claimed in claim 11, characterized in that said surface is a generally flat face between said mouth piece and ear piece, facing in said direction, and
    said deck and at least one of said keys are arranged in said face.

13. A handset as claimed in claim 12, characterized in that said face has at least one transition area between said deck and at least one of said pieces, and
    said plurality of keys includes at least one key disposed in a respective transition area.

14. A handset as claimed in claim 13, characterized by comprising a connection cable having a plug for insertion in a socket in a motor car, said cable being a coiled connecting cable.

15. A handset as claimed in claim 11, characterized by comprising a connection cable having a plug for insertion in a socket in a motor car, said cable being a coiled connecting cable.

16. A handset as claimed in claim 10, characterized in that said surface is a generally flat face between said mouth piece and ear piece, facing in said direction,
    said deck and at least one of said keys are arranged in said face,
    said face has at least one transition area between said deck and at least one of said pieces, and
    said plurality of keys includes at least one key disposed in a respective transition area.

* * * * *